Oct. 15, 1935.  E. J. THURBER  2,017,777
GEAR SHIFTING MECHANISM
Filed Nov. 19, 1934  3 Sheets-Sheet 1
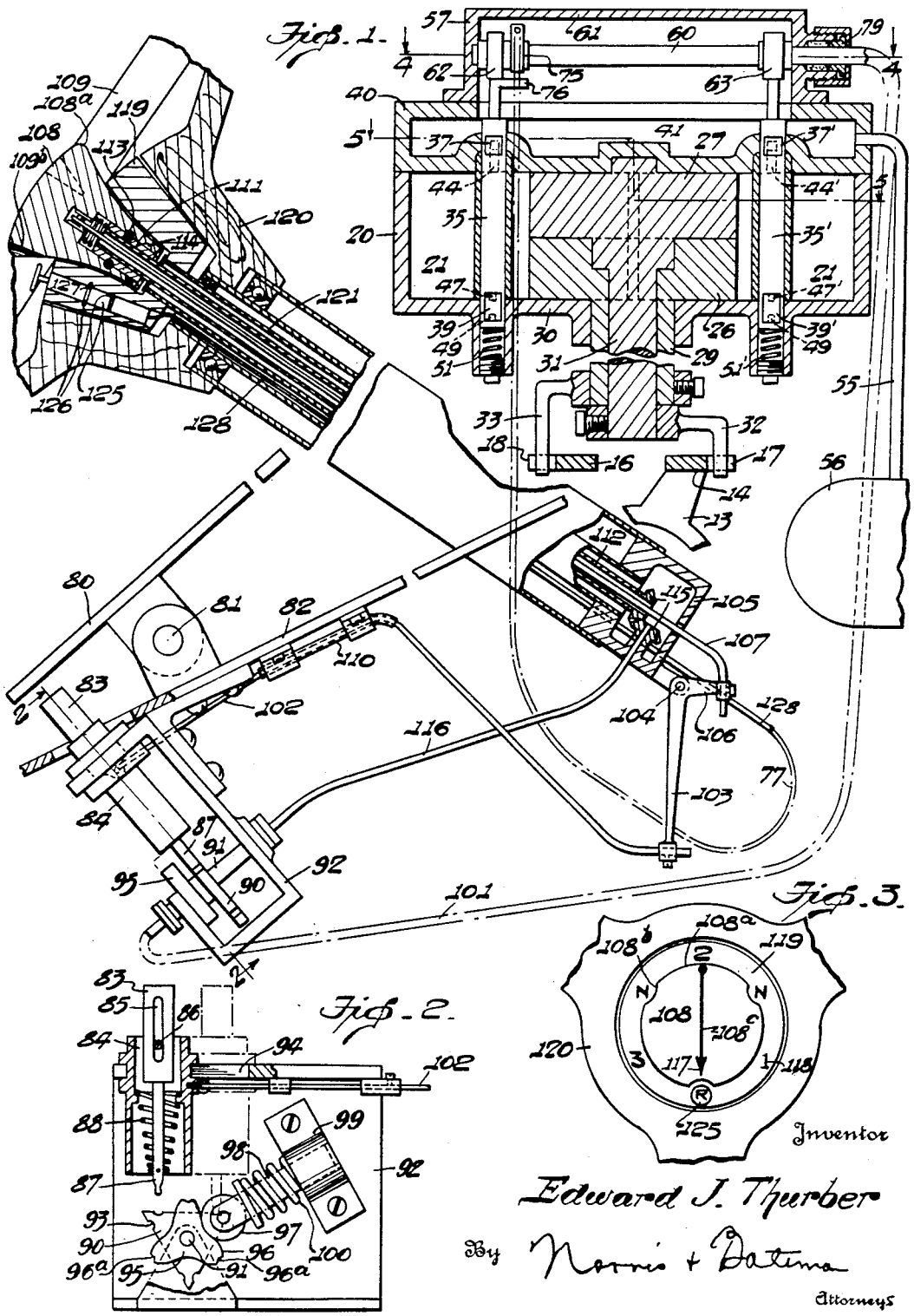
Inventor
Edward J. Thurber
By Norris + Bateman
Attorneys

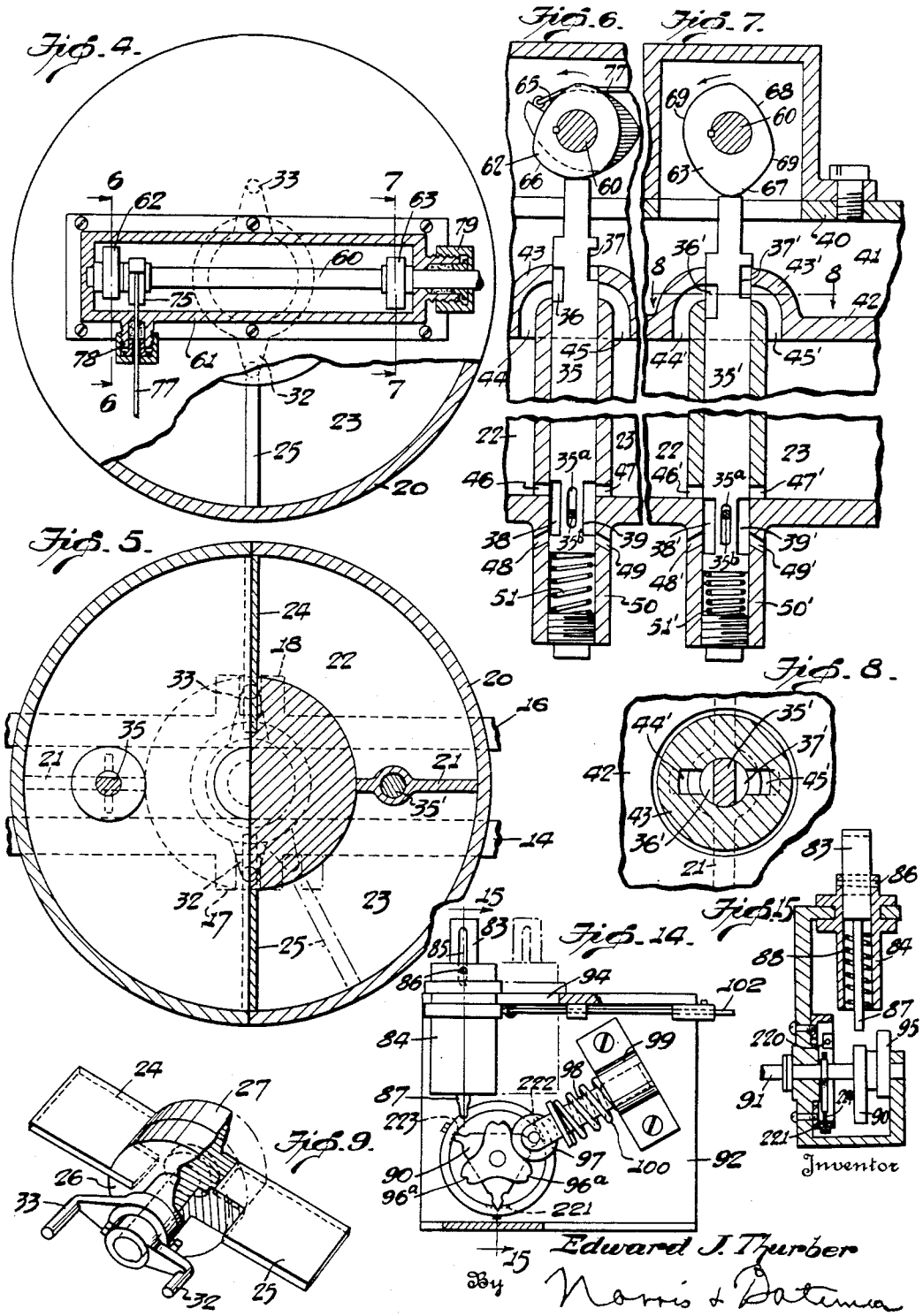

Oct. 15, 1935.  E. J. THURBER  2,017,777
GEAR SHIFTING MECHANISM
Filed Nov. 19, 1934   3 Sheets-Sheet 3
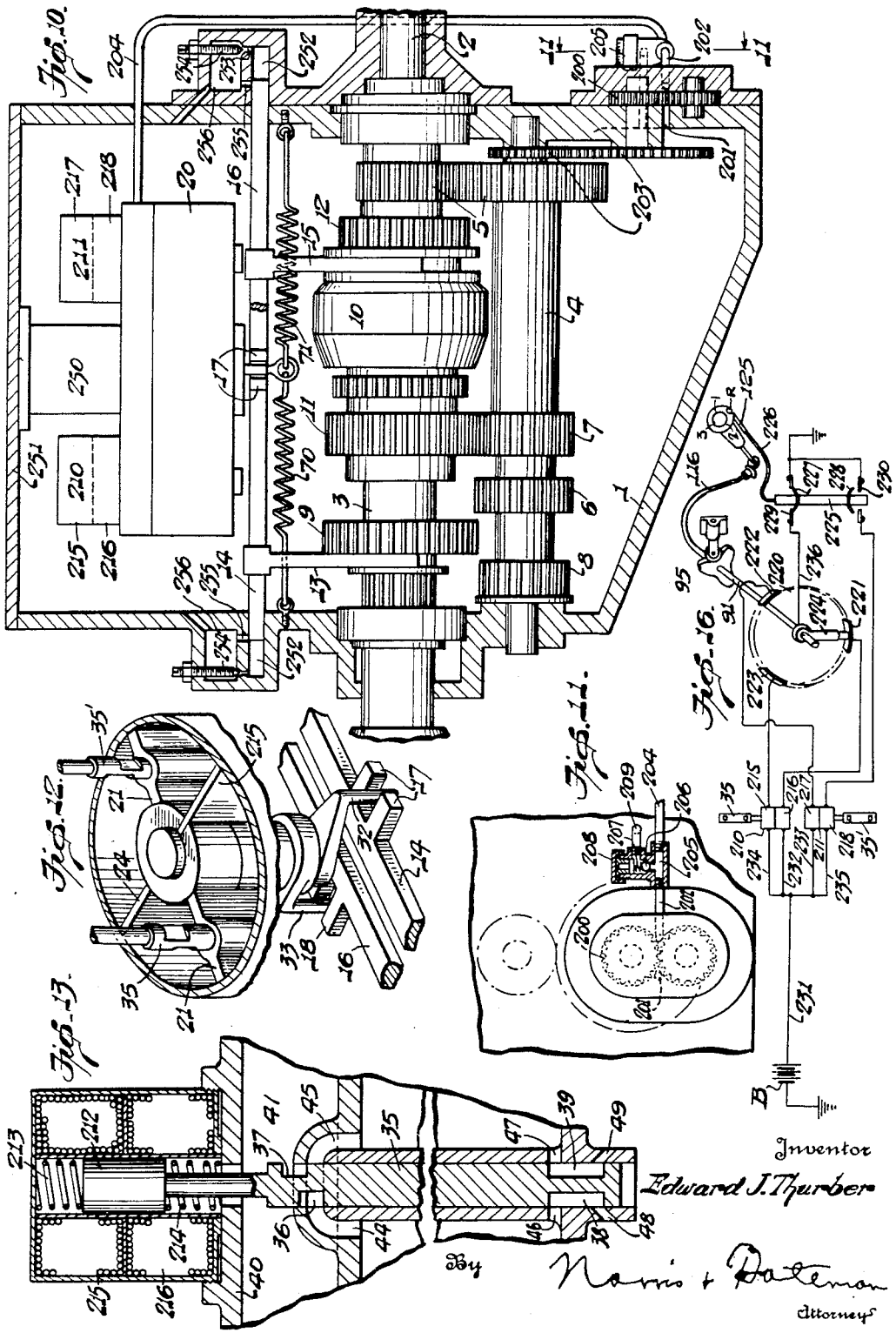
Inventor
Edward J. Thurber
By Norris + Bateman
Attorneys Patented Oct. 15, 1935

2,017,777

UNITED STATES PATENT OFFICE 2,017,777

GEAR SHIFTING MECHANISM

Edward J. Thurber, New Orleans, La., assignor of one-half to Ralph K. Rothrock, New Orleans, La.

Application November 19, 1934, Serial No. 753,739

21 Claims. (Cl. 74—364)

The present invention relates to improvements in means for controlling and shifting the change speed gears of an automobile transmission gearing whereby the shifting of such gears is facilitated and the manual manipulation of a hand lever such as usually provided for such purpose, is rendered unnecessary.

One of the primary objects of the present invention is to provide novel and improved gear shifting mechanism which may be readily applied to transmission gearings of the conventional types commonly used upon automobiles without requiring alteration or modification thereof.

Another object is to provide gear shifting mechanism of this character which is capable of operating with certainty to effect the gear changes as desired by the automobile driver, and which will operate, after it has shifted a speed changing gear of the transmission gearing into one or another of its operative positions, to hold the gear in such position until released therefrom by the operator when it is desired to shift such gear to another operative position or to neutral or inoperative position.

Another object is to provide gear shifting mechanism of this character which is operative automatically to effect the return of each speed changing gear to neutral or inoperative position while a change is being made from one speed to another.

Another object is to provide gear shifting mechanism of this class which embodies means for automatically selecting the different gear changes, either progressively from first speed up to third or high speed, or retrogressively from third or high speed down to second or first speed. Another object is to provide gear shifting mechanism of this class which embodies means for visually indicating to the driver at all times the gear or speed for which the mechanism is set.

A further object of the invention is to provide gear shifting mechanism of this class which embodies a fluid pressure operated actuating device which is constructed as a unit and which may be readily applied to an automobile transmission mechanism of conventional form, either exteriorly of the transmission mechanism as an attachment thereto or mounted interiorly of the transmission mechanism so that it forms substantially a part thereof.

To these and other ends the invention consists in certain improvements and combinations and arrangements of parts all as will be hereinafter more fully described, the features of novelty being pointed out more particularly in the claims at the end of this specification.

In the accompanying drawings:

Figure 1 is a view in elevation, partly in section, of gear shifting mechanism embodying the present invention;

Figure 2 is a detail section taken on the line 2—2 in Fig. 1;

Figure 3 is a detail view in top plan of the indicator on the top of the steering column for indicating the speed for which the shifting mechanism is set;

Figure 4 is a horizontal section through the fluid pressure operated actuating device, taken on the line 4—4 in Fig. 1;

Figure 5 is a horizontal section through the fluid pressure operated actuating device, taken on the line 5—5 in Fig. 1;

Figures 6 and 7 are detail vertical sections through the controlling valves for the fluid pressure operated actuating device, taken on the lines 6—6 and 7—7 respectively in Fig. 4;

Figure 8 is a detail horizontal section through one of the valves, taken on the line 8—8 in Fig. 7;

Figure 9 is a detail perspective view, partly in section, of the rotatable pistons or blades of the fluid pressure operated actuating device;

Figure 10 is a section taken vertically through an automobile transmission gearing of conventional form, showing the fluid pressure operated actuating device in modified form mounted therein;

Figure 11 is a detail section taken on the line 11—11 in Fig. 10;

Figure 12 is a perspective view, partly in section, showing the operative connections of the pistons of the fluid pressure operated device with the gear shifting bars of the transmission gearing;

Figure 13 is a detail vertical section taken axially through one of the controlling valves of the fluid pressure operated actuating device, showing solenoids associated therewith for actuating such valve;

Figures 14 and 15 are detail views showing the distributor switch for controlling the valve actuating solenoids; and Figure 16 is an electrical diagram showing the circuits connecting the electrical elements of the shifting mechanism shown in Figs. 10 to 15 inclusive.

Similar parts are designated by the same reference characters in the different figures.

Gear shifting mechanism according to the present invention is applicable generally to automobile transmission mechanisms of the conventional forms employing a pair of reciprocatory shifting bars connected respectively to the sliding gears or gear changing elements of the transmission mechanism, each of these bars being slidable from a normal or neutral position in either direction to effect one or another gear change. The preferred embodiments of the invention are shown in the accompanying drawings and will be hereinafter described in detail, but it is to be understood that the invention is not restricted to the precise constructions and arrangements shown since equivalent constructions and arrangements are contemplated and such will be included within the scope of the claims.

In the present instance, wherein the invention is shown applied to a transmission mechanism of a well known or conventional type commonly used upon automobiles, 1 represents the casing of the transmission mechanism, 2 the main drive or clutch shaft driven as usual through the usual clutch from the automobile engine, 3 represents the main shaft of the transmission mechanism which is connected at its rear end as usual to the rear or driving wheels of the automobile, 4 represents the usual countershaft of the transmission mechanism driven from the driving or clutch shaft 2 by gear 5 as usual, the countershaft having first, second and reverse gears 6, 7, and 8 fixed therein, and the main shaft 3 having sliding gear 9 splined thereon and shiftable from its normal or neutral position into mesh either with the first speed or reverse gear connected to the countershaft, the main shaft 3 also having a sliding gear element 10 splined thereon and shiftable in one or the other direction from its normal neutral position to clutch or engage it with a second speed gear 11 on the shaft 3 or with a third or high speed clutch member 12 fixed on the main drive or clutch shaft 2. The sliding gear 9 which sets the transmission mechanism for first or reverse gear is engaged by a shifting fork 13 fixed to a shifting bar 14 which is mounted to reciprocate in the transmission casing, and the second and third speed slidable gear element 10 is engaged by a shifting fork 15 which is fixed to a shifting bar 16 which is mounted to reciprocate in the transmission casing. The transmission mechanism shown and described is of a well known conventional form and is set for the different gear changes by reciprocation of the shifting bars 14 and 16 in the usual and well known manner, these shifting bars however being provided at their outer sides with forks 17 and 18 with which the shifting mechanism provided by the present invention engages to effect the operation of these shifting bars.

The present invention provides a fluid pressure operated device embodying a pair of rotatable pistons or blades which are connected respectively to the shifting bars of the transmission mechanism, so that rotation of one or the other of the pistons or blades from a normally central position in one or the other direction will effect movement of the shifting bar to which it is connected and thereby effect a gear change.

The fluid pressure operated actuating device, according to the present invention, comprises a circular cylinder 20 having a pair of partitions 21 fixed in diametrically opposite positions therein to divide the cylinder into a pair of piston chambers 22 and 23, in which operate a pair of pistons or blades 24 and 25, these pistons having a fluid tight fit in the respective chambers 22 and 23 and being rotatable about the center of the cylinder as an axis. These pistons are fixed at their inner ends to a pair of hubs 26 and 27 respectively so that they project radially therefrom, the inner ends of the pistons 24 and 25 being cut away to permit them to rotate relatively to the hubs 27 and 26 respectively, said hubs being mounted rotatably, one above the other and being circular so that they will form fluid tight fits with the inner edges of the partitions 21. As shown in Figure 1, the hub 26 has a sleeve 29 which fits rotatably in the bottom wall 30 of the cylinder and the hub 27 has a central stem or shaft 31 which fits rotatably in the sleeve 29. A crank 32 is fixed on the lower end of the shaft 31, this crank engaging the actuating fork 17 in the shifting bar 14, and a crank 33 is fixed on the sleeve 29 and engages the actuating fork 18 on the shifting bar 16. Normally, the pistons or blades 24 and 25 will occupy the mid positions within the respective chambers 22 and 23 as shown in Figure 5, the cranks 32 and 33 connected to the pistons being so set that the respective shifting bars 14 and 16 in the transmission mechanism will then be in neutral position. When the piston 25 is moved toward the right or the left in Figure 5 it will correspondingly shift the bar 14 in the transmission mechanism to slide the gear 9 into position for example for first speed forward or reverse, and when the piston 24 is moved toward the right or the left in Figure 5 it will shift the bar 16 in one or the other direction to move the sliding gear element 10 into position for example for third or high speed or second speed.

The movements of the pistons 24 and 25 under the action of fluid pressure are controlled by a pair of valves 35 and 35' which are fitted to reciprocate vertically in the respective partitions 21, these valves being preferably cylindrical in form and reciprocating in correspondingly shaped cylinders formed by the partitions. The valve 35 is provided near its upper end and in its opposite sides with ports 36 and 37 located at different heights therein, and this valve is provided near its lower end with a pair of ports 38 and 39 in its opposite sides and at the same level therein. The top of the cylinder 20 is closed by a casing 40 which has a fluid chamber 41 within it, and the lower wall 42 of this chamber is formed with a boss 43 which provides passages 44 and 45 which are adapted to establish communication between the port 36 in the valve and the chamber 22 at one side of the partition and between the port 37 in the valve and the chamber 23 at the other side of the partition. The valve inclosing portion of the partition is provided with ports 46 and 47 which lead from the respective chambers 22 and 23 to the ports 38 and 39 in the valve, and the bottom 30 of the cylinder is provided with ports 48 and 49 which are adapted to communicate respectively with the ports 38 and 39 in the valve. The lower end of the valve is fitted to reciprocate in a chamber 50 which may be formed as a part of the bottom 30 of the cylinder, and a spring 51 contained in this chamber acts upon the lower end of the valve with a tendency to lift it.

The ports 36 and 37 and 38 and 39 are located in such positions on the valve with respect to the passages 44 and 45 and 46, 47, 48, and 49 that when the valve 35 is in its intermediate position as shown in Figure 6, the passages 44 and 45 will be out of communication with the fluid chamber 41 above the cylinder but the ports 38 and 39 in the valve will establish communication between the chambers 22 and 23 and the ports 48 and 49 through the valve ports 38 and 39, thus providing vents for both of the pistons 24 and 25 through this valve; when the valve 35 is raised, the port 36 will establish communication from the fluid chamber 41 through the passage 44 to the chamber 22 of the cylinder and the port 46 will be out of communication with the vent 48; and when the valve 35 is in its lowered position, the port 37 in the valve will establish communication between the fluid chamber 41 and the passage 45 leading to the chamber 23 of the cylinder while the port 47 will be cut off from communication with the port 49 and the passage 44 will be cut off from the fluid chamber 41.

Rotation of the valves 35 and 35' out of their proper positions is prevented by grooves 35ª extending longitudinally therein and set screws 35ᵇ in the casing projecting into the respective grooves.

The valve 35' which is fitted into the other partition 21 is provided with ports 36' and 37' near its upper end and ports 38' and 39' near its lower end which correspond with the similarly designated ports for the valve 35, and the lower part of the partition in which the valve 35' is fitted is provided with ports 46' and 47' and vent ports 48' and 49' are formed in a chamber 50', these ports corresponding to the similarly designated ports for the valve 35, and a spring 51' acts on the valve 35' with a tendency to lift it, and the ports in the valve 35' control the passages 44' and 45' and the vent ports 46', 47', 48', and 49' in the different positions of this valve in the same manner that the corresponding ports are controlled by the valve 35.

Means is provided for setting the valves 35 and 35' in proper relationship to admit fluid pressure at one side of one or the other of the pistons 24 and 25 and exhaust fluid from the front of the piston which is to be actuated.

In that embodiment of the invention shown in Figure 1, the fluid pressure operated actuating device is operated by vacuum, for which purpose the fluid chamber 41 above the cylinder 20 may be connected by a pipe 55 to the intake manifold 56 of the automobile engine to utilize the vacuum existing in the intake manifold while the engine is in operation. In the embodiment of the invention shown in Figure 1, the fluid pressure operated actuating device is constructed separately and mounted exteriorly of the transmission gearing, it being mounted for example under the usual cowl 57 of the automobile body and supported in fixed position by any suitable means, the sleeve 29 and shaft 31 connected to the respective pistons being extended downwardly and through the top or cover of the transmission gearing located in its usual position in the automobile and the cranks 32 and 33 fixed to said shaft and sleeve engaging the shifting bars 14 and 16 in the transmission gearing.

The controlling means for the valves 35 and 35', in the embodiment shown in Figure 1, comprises a shaft 60 rotatably mounted in a casing 61 secured with a fluid tight fit on the chamber, this shaft having a pair of cams 62 and 63 fixed thereon and arranged to cooperate with the upper ends of the valves 35 and 35' respectively. The cam 62 has a low part 65, and a concentric portion 66 of intermediate height, and the cam 63 has a high part 67, a low part 68 and concentric portions 69 of intermediate height, these cams being so shaped and proportioned that when the low part of either cam is brought into engagement with the upper end of its valve such valve will be in its raised position and when the high part of the cam 63 is brought into engagement with the valve 35' such valve will be in its lowered position. When the concentric portion of either cam which is of intermediate height, is brought into engagement with its respective valve, such valve will be in its intermediate position. The cams 62 and 63 are fixed on the shaft 60 in the angular relationship shown in Figures 6 and 7, so that when the high part or the low part of one or the other cam is acting on its respective valve, a portion of intermediate height on the other cam is acting on its respective valve. Accordingly, rotation of the shaft 60 and the cams thereon through each third of a revolution will cause one of the valves to be set to establish a vacuum pressure at one side of one or the other of the pistons while the other valve is set to admit air at atmospheric pressure to the other side of such piston. Preferably, the cams 62 and 63 are so shaped and set on the shaft 60 that successive rotations of said shaft through one-third of a revolution at each rotation will so control the fluid pressure acting on the pistons as to cause operation thereof to set the transmission mechanism for first, second and third speeds forward respectively, these cams being shown so shaped and set in the present instance. For example, when the cams 62 and 63 occupy the positions shown in Figures 6 and 7, the high part 67 of the cam 63 will act on the valve 35' to move it into its lowered position, this valve then establishing communication between the cylinder chamber 23 at the right hand side of the piston 25 in Figure 5 with the fluid or vacuum chamber 41 while a portion 66 of intermediate height on the cam 62 will engage the valve 35 and the latter will then be in its middle position so that the cylinder chamber 23 at the left hand side of the piston 25 in Figure 5 will be in communication with the atmosphere through the ports 39, 47, and 49. The piston 25 will be thereby caused to swing toward the right in Figure 5, its crank 32 acting on the shifting bar 14 to move it in a direction to set the transmission gearing for first speed forward. A one-third revolution of the shaft 60 will bring one of the portions 69 of intermediate height on the cam 63 into engagement with the valve 35' allowing the latter to assume its intermediate position so that the cylinder chambers 22 and 23 at the right hand sides of the pistons 24 and 25 are placed in communication with the atmosphere through the ports 46' and 47', 38' and 39' and 48' and 49' while the low part 65 of the cam 62 will be brought into engagement with the valve 35 so that the latter moves into its upper position under the action of its spring 51, the port 36 in this valve then establishing communication between the vacuum chamber 41 and the cylinder chamber 22 at the left hand side of the piston 24 in Figure 5 while this part of the chamber 22 is cut off from the atmosphere by closing of the port 48 by the valve 35. The portions 66 and 69 of intermediate height on the cams 62 and 63 are of such extent that both valves will occupy their intermediate positions for a sufficient period to admit air at atmospheric pressure to the chamber 23 at both sides of the piston 25, thus allowing the piston 25 to return to its normal full line position shown in Figure 5, and the gear changing element 9 connected to the shifting bar 14 to return to its neutral or inoperative position, and lifting of the valve 35 while the valve 35' remains in its middle position establishes communication between the vacuum chamber 41 and the chamber 22 at the left hand side of the piston 24 in Figure 5 while the portion of this chamber at the right hand side of the piston 24 in that figure is in communication with the atmosphere through the valve 35', in consequence of which the piston 24 will be caused to swing toward the left in Figure 5, its crank 33 acting on the shifting bar 16 to move the gear changing element 10 in the transmission mechanism in a direction to set the latter for second speed forward. A further one-third revolution of the shaft 60 will rotate the cams 62 and 63 thereon to bring the portion 66 of intermediate height on the cam 62 into engagement with the valve 35 thereby setting this valve in its intermediate position so that the port 38 therein establishes communication between the cylinder chamber 22 at the left hand side of the piston 24 and the atmosphere and such further rotation of the shaft 60 retains one of the portions 69 of intermediate height on the cam 63 in engagement with the valve 35' so that the latter remains in its middle position and establishes communication between the chamber 22 at the right hand side of the piston 24 in Figure 5 with the atmosphere, thus allowing the piston 24 to return to its normal middle position shown by the full lines in Figure 5 and allowing the shifting bar 16 and the gear changing element 10 connected thereto to return to neutral or inoperative position, and as this one-third revolution of the shaft 60 is completed the low part 68 of the cam 63 is brought into engagement with the valve 35', allowing the spring 61' to lift this valve to its upper position, thereby establishing communication between the vacuum chamber 41 and the chamber 22 at the right hand side of the piston 24 in Figure 5, through the port 36', thereby causing the piston 24 to swing toward the right in Figure 5 and to thereby move the shifting bar 16 and the gear changing element 10 connected thereto in a direction to set the transmission mechanism for third or high speed forward.

According to the construction and mode of operation just described the gear changing elements of the transmission mechanism are progressively set for first, second and third speeds forward by imparting one-third revolutions successively to the cam shaft 30, and the transmission mechanism may be set for gear changes retrogressively from third speed to second speed and from second speed to first speed forward by imparting one-third revolutions successively to the cam shaft 60 in an opposite direction.

During each speed changing operation, the chambers 22 and 23 at opposite sides of the pistons 24 and 25 are placed in communication with the atmosphere so that the pressure is equalized on both sides of these pistons and they therefore may return to their normal intermediate positions as shown by the full lines in Figure 5. The shifting bars 14 and 16 and the gear changing elements 9 and 10 connected thereto may then be restored to neutral position by suitable means such for example as by a pair of springs 70 and 71 connected to each shifting bar and to the end walls of the transmission casing, these springs being balanced when the respective shifting bar is in its neutral position.

The shifting mechanism is operated to set the transmission gearing for reverse gear by a cam 75 which is mounted loosely on the shaft 60 so that it may rotate independently thereof, this cam being arranged to act on an arm 76 which extends laterally from the upper end of the valve 35. The cam 75 when swung in a direction to bring its high portion against the arm 76 on the valve 35 forces the latter into its lower position, thereby establishing communication between the vacuum chamber 41 and the cylinder chamber 23 at the left hand side of the piston 25 (Fig. 5) through the port 37 in said valve, the valve 35' being caused at this time to occupy its middle position by engagement with one of the portions 69 of intermediate height on the cam 63 so that the cylinder chamber 23 at the right hand side of the piston 25 in Figure 5 will then be in communication with the atmosphere, with the result that the piston 25 will be caused to swing toward the left in Figure 5, thereby moving the shifting bar 14 and the gear element 9 in a direction to set the transmission mechanism for reverse gear. The reverse gear cam 75 may be operated by a flexible cable 77 connected to this cam and extending through a stuffing box 78 in the casing 61 to prevent leakage of air along the cable, and the cam shaft 60 also extends through a stuffing box 79 in an end of the casing 61 to prevent leakage of air along this shaft.

Control means for the cam shaft 60 may be located in any suitable position on the automobile convenient for operation by the automobile driver, the control means shown in the present instance being located beneath the rear or heel portion of the usual accelerator pedal 80 which controls the carburetter of the automobile engine, the accelerator pedal being pivoted at 81 on the floor or foot board 82 of the automobile. The control means for the shaft 60 comprises a plunger 83 the upper portion of which is square and is mounted to reciprocate vertically in a rectangular socket 84, the plunger having a vertical slot 85 therein in which is fitted a pin 86 secured in the socket 84, said pin serving to limit the vertical reciprocating movements of the plunger and the latter being rockable laterally on this pin as a center. The plunger has a stem 87 which extends downwardly therefrom and a spring 88 is connected to the stem and to the socket 84 and serves to normally hold the plunger in its lifted position, the yield of the spring permitting the plunger to rock laterally. A substantially triangular cam 90 is mounted below the plunger, this cam being fixed on a shaft 91 which is mounted rotatably in a bracket 92, the latter being fixed to the under side of the foot board. The cam 90 is provided at points adjacent to its apices with recesses 93 in which the lower end of the plunger stem 87 may engage. The socket 84 is shiftable laterally in a slot 94 formed in the bracket 92 so that the lower end of the plunger stem 87 may be brought into a position at one or the other side of the shaft 91 to act on the cam 90 and rotate it in one or the other direction when the plunger is depressed. Normally, the plunger 83 and its socket 84 will occupy the full line position shown in Figure 2, the lower end of the plunger stem then engaging the cam 90 at one side of its shaft. Depression of the plunger will rotate the cam, and in order to assist in the rotation of the cam and insure completion of one-third of a revolution thereof at each actuation of the plunger, a second cam 95 is fixed on the shaft 91 to rotate with the cam 90, the cam 95 having three lobes 96 thereon with intervening depressions in which a roller 97 on a plunger 98 is engageable, this plunger being guided to reciprocate toward and from the cam 95 by a guide 99 fixed on the bracket 92, and a spring 100 acts on the plunger 98 to urge the roller 97 against the cam 95. The cam 95 is so set in relation to the cam 90 that when the latter occupies the normal position shown in Figure 2, the roller 97 will rest in one of the depressions in the cam 95. When the cam 90 is rotated by depression of the plunger 83, the roller 97 will ride up on the adjacent lobe 96 of the cam 95, and as soon as the center of this lobe passes the roller 97, the latter, acting under the power stored in the spring 100, will cause said roller to ride down the other side of the lobe into the next depression in the cam 95, and in so doing, will complete a one-third revolution of the cam 90 and shaft 91. The lateral yield permitted the plunger 83 will allow the lower end of the plunger stem 87 to deflect past the next following apex of the cam 90 and to engage in the depression 93 at the upper side of this cam. The shaft 91 to which the cams 90 and 95 are fixed is connected by suitable means, such as by a flexible shaft 101 to the cam shaft 60 as shown in Figure 1, so that each actuation of the plunger 83 will impart a one-third revolution to the cam shaft 60 to effect a gear change in the transmission mechanism. By locating the plunger 83 beneath the rear or heel 10 of the usual accelerator pedal 80, the latter may be utilized to effect the gear changes by rocking the accelerator pedal rearwardly so as to depress said plunger to effect each gear change.

Means is provided for rotating the shafts 60 and 91 in one or the other direction to enable the transmission mechanism to be set progressively for first, second and third speeds forward by successive actuations of the plunger 83, or for gear changes retrogressively from third speed to second or first speed by successive actuations of the plunger 83. Such is accomplished according to the construction shown by shifting the plunger 83 and its socket 84 laterally in the slot 94 in the bracket 92 so that the plunger stem 87 will act on the cam 90 at one or the other side of the shaft 91. For example, when the plunger 83 and socket 84 occupy the full line position shown in Figure 2, actuation of the plunger 83 will rotate the shafts 91 and 60 in a direction to effect gear changes in the transmission mechanism progressively through first, second or third speeds forward, and when the plunger 83 and the socket 84 are shifted into the dotted line position shown in Figure 2, successive actuations of the plunger will effect gear changes in the transmission mechanism retrogressively from third speed to second and first speeds.

Means within convenient reach of the automobile driver is provided for shifting the plunger 83 for progressive or retrogressive gear changes, such means comprising preferably a relatively stiff wire 102 one end of which is attached to the plunger socket 84 and the other end of which is attached to an arm 103 of a bell crank which is pivoted at 104 on the lower end of the usual steering column 105, the other arm 106 of the bell crank being connected to a relatively stiff wire 107 which extends upwardly through the steering column and is fixed at its upper end to a knob 108 which is mounted within the hub of the usual steering wheel 109. The wire 102 is guided to slide in an outer sheath 110 which may be secured to the under side of the floor board. The knob 108 is splined to slide axially on a sleeve 111 which is fixed to the upper end of a tube 112, the latter being mounted rotatably within the steering column, and the sleeve 111 is recessed circumferentially to contain a spring ring 113 which is engageable in one or another of a pair of circumferential recesses 114 formed within the knob 108, the spring ring 113 serving to yieldably hold the knob in a raised or lowered position by engaging one of the recesses therein. While the knob 108 occupies its normal lowered position as shown in Figure 1, the plunger 83 and socket 84 will occupy the full line position shown in Figure 2, and when the knob 108 is pulled upwardly, it will act through the wires 107 and 102 and the bell crank lever 103 to pull the plunger 83 and socket 84 into the dotted line position indicated in Figure 2.

The knob 108 also serves to indicate at all times the different speeds for which the shifting mechanism is set, it being connected for this purpose to the sleeve 112 so as to rotate therewith and the sleeve 112 is connected by gears 115 to a flexible shaft 116, this shaft being connected to the shaft 91 which carries the cams 90 and 95, so that the knob 108 will rotate into different positions corresponding to the positions in which the cams 90 and 95 are rotated by the successive actuations of the plunger 83. The knob 108 is preferably provided with a pointer 117, and suitable indicia 118 to cooperate with the pointer are provided on the upper surface of an annular member 119, this member surrounding the knob and being supported non-rotatably in the hub 120 of the steering wheel by a tube 121 which is fixed within the steering column. Due to the connection described between the knob 108 and shaft 91, the knob 108 may serve as manual means for rotating the shaft 91 to set the shifting mechanism for different desired gear changes.

The tops of the lobes 96 of the cam 90 are provided with recesses 96ª in which the spring pressed roller 97 may rest while the cam is midway between each third revolution thereof at which times the portions 66 and 69 of intermediate height on the cams 62 and 63 are in engagement with the valves 35 and 35', so that when the plunger is partially depressed to bring one of these recesses 96ª opposite to the roller 97, the valves 35 and 35' will be set in their mid positions to establish equal fluid pressure at opposite sides of the pistons 24 and 25 and thereby allow them to assume neutral positions between all gear shifts, the gear changing elements being thus allowed to return to neutral.

The control means for the reverse gear cam 75 comprises preferably a plunger 125 fitted to reciprocate in the member 119 surrounding the knob 108, this plunger being provided with a pair of circular grooves 126 in one or the other of which a spring ring 127 in the member 119 may engage to yieldably hold this plunger in lowered or raised position. The plunger 125 is suitably connected to the flexible wire 77 connected to the reverse cam 75, as by a flexible cable 128 of well known construction comprising an outer spiral wire jacket in which the wire 77, which is relatively stiff, is slidable so that while the plunger 125 is in its normal lowered position as shown in Figure 1, the reverse cam 75 will be in its normal inactive position as shown in this figure and in Figure 6, but when the plunger 125 is pulled upwardly by the knob on its upper end, the tension thus applied to the wire 77 will rotate the reverse cam 75 into engagement with the arm 76 on the upper end of the valve 35 and will move this valve into its lower position to cause operation of the fluid pressure actuated device to set the transmission mechanism for reverse gear.

The reverse gear change is made while one of the recesses 96ª of the cam 90 is in engagement with the roller 97 to hold said cam in intermediate position of rotation, at which times the cams 62 and 63 will occupy such positions as to present portions thereof of intermediate height to the valves 35 and 35' and thereby cause the latter to occupy their intermediate positions, and in order to insure that the cam 90 is properly set for reverse gear change and prevent an attempt to make such a gear change while the shifting mechanism is not properly set therefor, an intercontrol is provided between the knob 108 and the reverse plunger 125. In the present instance, the plunger is located to underlie, partially at least, an overhanging rim 108ª on said knob, and this rim is provided with recesses 108ᵇ one or another of which will register with the reverse plunger and thereby permit retraction thereof when one or another of the recesses 96ª of the cam 90 is in engagement with the roller 97, as indicated for example by the arrow 108ᶜ on the knob in Fig. 3, and while the knob 108 is rotated into any other position where its rim 108ª overhangs the reverse plunger, the latter will be restrained against actuation. The positions into which the knob may be rotated to set the mechanism to return the gear changing elements of the transmission to neutral are designated "N" in Fig. 3 with which the arrow 108ᶜ may cooperate.

The general operation of the gear shifting mechanism hereinbefore described and shown in Figures 1 to 9 inclusive is as follows:—Assuming the engine of the automobile to be in operation so that a vacuum is produced in the vacuum chamber 41 of the actuating device, and that the cam shaft 60 occupies the position shown in Figures 6 and 7, the valves 35 and 35' will be set in such relation as to cause the piston 25 to swing toward the right in Figure 5, thereby moving the shifting bar 14 in a direction to set the transmission mechanism for first speed forward. Second speed forward is produced by depressing the plunger 83, thereby causing rotation of the cam shaft 60 through a one-third revolution to bring it into its next operative position. The cams on the shaft 60 will then be in such positions as to set the valves 35 and 35' to cause the piston 24 to swing toward the left in Figure 5, thereby moving the shifting bar 16 in a direction to set the transmission mechanism for second speed. During the rotation of the cam shaft 60 into this position, both valves 35 and 35' are brought to their middle positions so that air pressure is equalized at both sides of the piston 25 and the latter is returned to its normal middle position and the shifting bar 14 is returned to its normal neutral position by the equalizing action of the springs 70 and 71 connected thereto. A succeeding actuation of the plunger 83 rotates the cam shaft 60 through another one-third revolution, the cams thereon during such rotation bringing both valves 35 and 35' to their middle positions to equalize air pressure at opposite sides of the piston 24 so that the latter may return to its normal middle position and the shifting bar 16 may return to its normal neutral position under the equalizing action of the springs connected to this bar, and when the came shaft 60 has been brought into its third position the cams thereon will set the valves 35 and 35' so as to cause the piston 24 to swing toward the right in Figure 5 thereby moving the shifting bar 16 in a direction to set the transmission mechanism for third speed forward. The transmission mechanism is thus set automatically by successive actuations of the plunger 83 while the latter occupies the full line position shown in Figure 2 for gear changes progressively through first, second and third speeds forward. The transmission mechanism may be set for gear changes retrogressively from third speed to second or first speed by pulling the knob 108 upwardly, thereby shifting the plunger 83 and its socket 84 into the dotted line position shown in Figure 2. Successive actuations of the plunger 83 will then rotate the cam shaft 60 in an opposite direction from that previously described, so that the valves 35 and 35' will successively set in such positions as to cause operation of the pistons 24 and 25 in a manner the reverse of that described so that the gear changes will be made in the reverse order.

The transmission mechanism is set for reverse gear by partially depressing the plunger 83 to bring a recess 96ª in the cam 90 into engagement with the roller 97, at which time one of the recesses 108ᵇ in the knob 108 will register with the plunger 125 and then pulling said plunger upwardly, such operation of this plunger pulling the wire 77 and thereby rotating the reverse cam 75 to bring it into engagement with the valve 35 to move the latter from the mid position which it then occupies into its lowered position, thereby causing the piston 25 to swing toward the left in Figure 5, thereby moving the shifting bar 14 in a direction to set the transmission in reverse gear.

Figures 10 to 16 inclusive disclose another embodiment of the invention wherein fluid pressure such as oil under pressure is employed to operate the fluid pressure operated actuating device and solenoids are employed for controlling the valves of said device. In this embodiment of the invention, a gear pump 200 is provided in the transmission casing, it having an inlet 201 to receive oil from the transmission casing and an outlet 202 through which oil is discharged from the pump. This pump may be driven continuously while the automobile engine is in operation, by gears 203 connected to the countershaft 4 of the transmission mechanism. The pump discharge 202 is connected by a pipe 204 to the fluid chamber 41 of the actuating device so that a pressure will be produced in this chamber instead of a vacuum, as in the embodiment previously described. A pressure relief valve 205 is preferably connected in the pipe 204 to prevent the development of excess oil pressure therein, this valve having a valve member 206 which is yieldably pressed against its seat by a spring 207, the power of which may be adjusted to regulate the oil pressure by a screw cap 208, the discharge pipe 209 leading from this pressure regulating valve back into the transmission casing so that oil released through this valve may return to the transmission casing.

The valves 35 and 35' are provided with solenoids 210 and 211, each solenoid having a core 212 which is connected to the respective valve and with springs 213 and 214 located at opposite sides of the solenoid core, these springs being normally balanced when the respective valve is in its middle position so that the vent ports at the bottoms of the valves will be normally opened. The solenoids 210 and 211 are provided each with a pair of windings 215 and 216 and 217 and 218 so that the energizing of one or the other of the windings of either solenoid will move the respective valve into its raised or lowered position. The construction and mode of operation of the fluid pressure operated actuating device in this embodiment of the invention are the same as in the embodiment thereof previously described except that the springs 51 and 51' are omitted.

The solenoids are controlled in this embodiment of the invention by a distributor switch 220 which embodies a set of three contacts 221, 222, and 223 and a rotatable contact member 224, the latter being fixed to the shaft 91 on which the cams 90 and 95 are mounted, so that successive actuations of the plunger 83 will bring the contact member 224 progressively into engagement with the contacts 221, 222 and 223 or retrogressively into engagement with these contacts in the reverse order. A reverse switch 225 is also provided, this switch being connected by a flexible cable 226 to the plunger 125 so that when this plunger is in a normally raised position, the switch 225 will be set for forward speed changes and when said plunger is lowered the switch 225 will be set for reverse gear. The switch 225 carries upper and lower contact members 227 and 228 adapted to bridge and connect contact plates 229 and 230.

The usual battery B employed generally on automobiles may be utilized as a source of electrical energy for operating the valve controlling solenoids. As shown by the diagram in Figure 16, one terminal of this battery may be grounded on the frame of the automobile, the other terminal of the battery being connected by a wire 231 to wires 232, 233, and 234 which are connected to the contacts 221, 222, and 223 respectively of the distributing switch, these wires including in circuit therewith the appropriate windings of the solenoids 210 and 211 to set the respective valves for first, second and third speeds respectively when energized. Another wire 235 has connected therein the contacts 230 of the reverse switch and this wire includes therein the appropriate winding of the proper solenoid to set the respective valve to cause operation of the actuating device to set the transmission mechanism in reverse gear when such solenoid winding is energized. The contacts 229 of the reverse switch are connected in series by a wire 236 which grounds the rotary contact member 224 of the distributing switch. Accordingly, while the reverse switch 225 is in its normal raised position, the circuit through the distributing switch for effecting the different forward gear changes is completed by the contact member 227 of the reverse switch which then bridges the contacts 229, but when it is desired to set the transmission mechanism in reverse gear the reverse switch 225 is moved into its lowered position by depression of the plunger 125, the circuit through the wire 236 and the distributing switch being then broken and the contact 228 on the reverse switch bridging the contacts 230 and thereby closing the circuit through the appropriate solenoid winding for a shift of the transmission mechanism into reverse gear. By this arrangement the circuits of the different valve controlling solenoids will be closed and completed by the distributor switch or the reverse switch, so that the desired gear change will be made as the plunger 83 is operated to bring the movable contact 224 into engagement with the respective contacts 221, 222, and 223, or the reverse switch is operated to engage the contacts 228 and 230, thereby completing the circuit through the appropriate winding of one or the other of the solenoids, according to the gear change to be made, and each solenoid will continue to be energized as long as said movable contact remains in engagement with one of said other contacts, or the reverse switch is in operative position, thereby holding the respective valve 35 or 35' in its actuated position against the action of its neutralizing spring 51 or 51', and thus prevent return of the gear changing element to neutral position while the controlling contacts for the respective solenoid are engaged.

The fluid pressure operated actuating device 10 employing the solenoids for setting or controlling the valves thereof and using oil pressure as the actuating fluid is of the same construction as that hereinbefore described employing the cams for setting or controlling the valves, and it is shown in Figure 10 as mounted within the transmission casing, it having a bracket 250 secured thereto the bracket being suitably secured to the top or cover 251 of the upper portion of the transmission casing.

In order to control the speed at which the shifting bars 14 and 16 operate under the action of the oil pressure and also if desired, under the action of the vacuum hereinbefore described, each end of each of these bars may be fitted to reciprocate in a chamber 252 in the respective end wall of the transmission casing, each chamber having a vent port 253 leading from its outer end into an oil reservoir 256 and provided with a valve 254 which is adjustable to vary the effective size of the vent port. Each of the chambers 252 is also provided with a port 255 leading thereto from the oil reservoir 256 at a point toward the inner end of the respective chamber. By this arrangement, when the shifting bars 14 and 16 are in central or neutral position, oil will flow from the oil reservoirs 256 into the chambers 252. As one or the other of the shifting bars 14 and 16 moves from its middle or neutral position in a direction to effect a gear change, an end of such bar will move into the respective chamber 252, forcing oil therefrom through the port 253 into the oil reservoir 256, the escape of oil being restricted by the valve 254, thus retarding such movement of the shifting bar and thereby controlling the speed at which it effects the gear change, thus avoiding clashing of the gears.

The operation of the shifting mechanism employing solenoids for controlling the valves and oil pressure as an actuating fluid, is as follows. Assuming the engine of the automobile to be running, the pump 200 will operate to develop an oil pressure in the pipe 204 and the fluid chamber 41, excess oil pressure being avoided by the relief valve 205 which by-passes oil back to the transmission casing. To set the shifting mechanism for first speed, the plunger 83 is actuated or the knob 108 is rotated, after operation of the clutch pedal to disengage the driving clutch, until the pointer 117 registers with the mark "1" on the member 119 in the hub of the steering wheel, the contact part 224 of the distributing switch then engaging the contact 221 which is in circuit with the solenoid 216 for the valve 35, thereby completing the circuit through the solenoid winding 216, the latter operating to move the valve 35 into its lower position and thereby admit oil under pressure from the fluid chamber 41 into the cylinder chamber 23 at the left hand side of the piston 25 in Figure 5, thereby causing this piston to swing toward the right in that figure and to actuate the shifting bar 14 in a direction to engage the gears of the transmission mechanism for first speed. Since the solenoids for the valve 35' during this operation are de-energized, this valve will occupy its middle position so that the vent ports in the lower portion thereof will be open to permit oil from the chamber 23 in front of the piston 25 to discharge. Second speed is obtained by depressing the plunger 83 or rotating the knob 108 to bring the pointer 117 into register with the mark "2" at the top of the steering column. As soon as the contact member 224 moves out of engagement with the contact 221, the solenoid 216 will be de-energized, and since the solenoids for the valve 35' will also be de-energized at this time, both valves 35 and 35' will occupy their middle positions with the vents in the lower portions thereof open, so that the springs 70 and 71 may act on the shifting bar 14 and the piston 25 to return these parts to their normal neutral position. Engagement of the contact member 224 with the contact 222, after operation of the clutch pedal 241 to disengage the driving clutch of the automobile, connects the solenoid 217 of the valve 35' in circuit, thereby completing the circuit through the solenoid 217, this solenoid acting to move the valve 35' into its upper position whereby oil under pressure is admitted from the fluid chamber 41 into the cylinder chamber 22 at the right hand side of the piston 24 in Figure 5, and since the solenoids for the valve 35 will be de-energized at this time so that the vent ports in the lower portion thereof will be open, the piston 24 will be swung toward the left in Figure 5, thereby actuating the shifting bar 16 in a direction to set the transmission mechanism for second speed. Third speed is obtained by again actuating the plunger 83 or rotating the knob 108, after operation of the clutch pedal to disengage the driving clutch of the automobile, until the pointer 117 registers with the mark "3" at the top of the steering column, the contact member 224 being thereby brought into engagement with the contact 223. As the contact member 224 moves out of engagement with the contact 222, the circuit through the solenoid 217 is broken so that the valve 35' may return to its middle position, with the vent ports in the lower portion thereof open to permit discharge of oil from the chamber 22 in front of the piston 24. Engagement of the contact member 224 with the contact 223 completes the circuit through the solenoid 215, the latter acting to move the valve 35 into its upper position, thereby admitting oil under pressure from the fluid pressure chamber 41 into the cylinder chamber 22 at the left hand side of the piston 24 in Figure 5, thereby causing said piston to swing toward the right in that figure and thereby actuate the shifting bar 16 in a direction to set the transmission gearing for third speed forward. Retrogressive shifting of the gears of the transmission mechanism from third speed to second or first speed forward is accomplished by shifting the plunger 83 and its socket 84 so that it will rotate the shaft 91 and the distributor switch contact member 234 in the opposite direction, or by rotating the knob 108 in the opposite direction than that previously described, the solenoids and the valves being then operated in the reverse order to that previously described.

The transmission mechanism is set for reverse gear by pushing the plunger 125 downwardly, thereby shifting the reverse switch 225 in a direction to disengage the contact 227 thereon from the contacts 229 and to engage the contact 228 on the reverse switch with the contacts 230, after disengagement of the driving clutch of the automobile, a circuit being thereby closed through the solenoid 218 for the valve 35', such solenoid acting to move the valve 35' into its lower position, thereby admitting oil under pressure from the chamber 41 to the cylinder chamber 23 at the right hand side of the piston 25 in Figure 5, and since the solenoids controlling the valve 35 at this time will be de-energized so that this valve will occupy its middle position with its vent ports in the lower portion thereof open, the piston 25 will be moved toward the left in Figure 5, thereby actuating the shifting bar 14 in a direction to set the transmission mechanism for reverse gear.

I claim as my invention:—

1. Shifting mechanism for an automobile transmission mechanism embodying shiftable gear changing elements, comprising fluid pressure operated actuating means including a plurality of pistons concentrically pivoted each to swing in opposite directions and having means for operatively connecting them respectively to said gear changing elements, and valves for said pistons for controlling the action of fluid pressure thereon to cause actuation of one or another thereof in one or the other direction.

2. Shifting mechanism for an automobile transmission mechanism embodying a pair of shiftable gear changing elements, comprising fluid pressure operated actuating means including a pair of blade-shaped pistons concentrically pivoted each to swing in opposite directions and having means for operatively connecting them respectively to said gear changing elements, and a pair of valves each common to both pistons for controlling the action of fluid pressure to cause actuation of one or the other of said pistons in one or the other direction.

3. Shifting mechanism for an automobile transmission mechanism embodying shiftable gear changing elements, comprising a fluid pressure casing having a pair of adjacently located arcuate chambers, a piston pivoted to swing in opposite directions in each chamber and having means for operatively connecting it to one of said gear changing elements, and valves mounted on the cylinder and having ports operative, at different settings of said valves, to control the action of fluid pressure on one or the other of the pistons to cause movement thereof in one or the other direction.

4. Shifting mechanism for an automobile transmission mechanism embodying shiftable gear changing elements, comprising a fluid pressure casing having a partition dividing it into a pair of chambers, a pair of blade-shaped pistons pivoted coaxially to swing in the respective chambers and having means for operatively connecting them to the respective gear changing elements, and valves mounted on the casing and having ports operative at different settings of said valves to control the action of fluid pressure on said pistons.

5. Shifting mechanism for an automobile transmission mechanism embodying shiftable gear changing elements, comprising fluid pressure operated actuating means including coaxially pivoted rotatable pistons having coaxially mounted shafts for operatively connecting them to the respective gear changing elements, valves having ports operative at different settings thereof to control the action of fluid pressure on said pistons, and means cooperative with said valves to set them in different operative positions.

6. Shifting mechanism for an automobile transmission mechanism embodying shiftable gear changing elements, comprising fluid pressure operated actuating means including a pair of rotatable pistons, a pair of shafts one sleeved over the other and connected to the respective pistons for operatively connecting them to the respective gear changing elements, a pair of valves having ports operative at different settings thereof to control the action of fluid pressure on said pistons, and means cooperative with the respective valves to set them in different operative positions to control the operation of said pistons.

7. Shifting mechanism for an automobile transmission mechanism embodying a pair of shiftable gear changing elements, one shiftable in opposite directions to set the transmission mechanism for first speed forward and reverse and the other shiftable in opposite directions to set the transmission mechanism for second and third speeds forward, comprising fluid pressure operated means including a pair of pistons each movable in opposite directions and having means for operatively connecting them to the respective gear changing elements, a pair of valves capable of being set in different positions to control the action of fluid pressure on said pistons to cause movement of one or the other thereof in one or the other direction, a cam shaft having a pair of cams thereon cooperative with the respective valves and operative, by successive partial rotations thereof, to set the valves to cause movements of the pistons to effect gear changes in the transmission mechanism for different speeds forward in predetermined order, and a separate cam operable independently of said pair of cams and cooperative with one of said valves to set it to cause movement of one of the pistons to effect another gear change in the transmission mechanism for reverse.

8. Shifting mechanism for an automobile transmission mechanism embodying shiftable gear changing elements, comprising fluid pressure operated actuating means including blade-shaped pivoted pistons having means for operatively connecting them to the respective gear changing elements and each reciprocable in opposite directions to effect different gear changes, valves having ports operative at different settings thereof to control the action of fluid pressure on said pistons to move them in one or the other direction, and means cooperative with said valves to position them in said different settings.

9. Shifting mechanism for an automobile transmission mechanism embodying a pair of shiftable gear changing elements each reciprocable in opposite directions to effect different gear changes, comprising a cylinder having partition means dividing it to form a pair of chambers therein, a pair of concentrically pivoted pistons mounted respectively to move in said chambers and having means for connecting them respectively to said gear changing elements, and a pair of valves mounted in said partition means and having ports operative, at different settings of the valves, to admit fluid pressure to one or the other of said chambers at one side of the piston therein and discharging fluid from the other side of such piston.

10. Shifting mechanism for an automobile transmission mechanism embodying a pair of shiftable gear changing elements each reciprocable in opposite directions to effect different gear changes, comprising a cylinder having partition means dividing it to form a pair of chambers therein, a pair of concentrically pivoted pistons mounted respectively to move in said chambers, a pair of cranks connected respectively to said pistons and operatively engaging said gear changing elements, and valves for controlling the action of fluid pressure on said pistons to cause movement of one or the other thereof.

11. Shifting mechanism for an automobile transmission mechanism embodying shiftable gear changing elements, comprising as a unit fluid pressure operated actuating means including a casing, blade-shaped pistons mounted concentrically therein to swing in opposite directions, valves having ports communicating with the casing for controlling the action of fluid pressure on said pistons to swing them in one or the other direction, and means connected respectively to said pistons for operatively connecting them to the gear changing elements of the transmission mechanism.

12. Shifting mechanism for an automobile transmission mechanism embodying shiftable gear changing elements, comprising as a unit fluid pressure operated actuating means including a cylinder, a pair of pistons mounted concentrically to rotate therein, valves contained within the cylinder for controlling the action of fluid pressure on said pistons to actuate them, a pair of shafts, one sleeved over the other and connected respectively to said pistons, and cranks connected respectively to said shafts for connecting the pistons respectively to the gear changing elements of the transmission mechanism.

13. Shifting mechanism for an automobile transmission mechanism embodying shiftable gear changing elements, comprising fluid pressure operated actuating means including pistons having means for operatively connecting them to the respective gear changing elements, valves having ports operative at different settings thereof to control the action of fluid pressure on said pistons, and cams cooperative with said valves to set them in different operative positions, and means operative by successive actuations thereof to rotate said cams to set the valves in different positions to effect different gear changes in predetermined order.

14. Shifting mechanism for an automobile transmission mechanism embodying shiftable gear changing elements, comprising fluid pressure operated actuating means including pistons having means for operatively connecting them to the respective gear changing elements, valves having ports operative at different settings thereof to control the action of fluid pressure on said pistons, solenoids cooperative with said valves to set them in different positions, and means including a distributer switch operative by successive actuations thereof to energize said solenoids to set the valves in different positions to effect different gear changes in predetermined order.

15. Shifting mechanism for an automobile transmission mechanism embodying shiftable gear changing elements, comprising fluid pressure operated actuating means including pistons having means for operatively connecting them to the respective gear changing elements, valves having ports operative at different settings thereof to control the action of fluid pressure on said pistons, means cooperative with said valves to set them in different operative positions, means operative by successive actuations thereof to cause actuation of said valve setting means to set the valves in different positions to effect different gear changes in predetermined order, and means operative by said actuating means for indicating the different gear changes for which the valves are set.

16. Shifting mechanism for an automobile transmission mechanism embodying shiftable gear changing elements, comprising fluid pressure operated actuating means including pistons having means for operatively connecting them to the respective gear changing elements, valves having ports operative at different settings thereof to control the action of fluid pressure on said pistons, solenoids cooperative with said valves to set them in different positions, a rotatable control member successively operable manually, means including a distributer switch operative by successive actuations of said control member to energize said solenoids to set the valves in different positions to effect different gear changes in predetermined order, and means rotatable by said control member for indicating the different gear changes for which the distributer switch is set.

17. Shifting mechanism for an automobile transmission mechanism embodying shiftable gear changing bars, fluid pressure operated means for actuating said bars, chambers in which an end of each of said bars reciprocates, and oil reservoirs each having ports connecting it with the respective chamber to supply oil thereto and receive oil therefrom to control the speed of shifting movement of the respective bar in the respective chamber.

18. Shifting mechanism for an automobile transmission mechanism embodying shiftable gear changing bars, fluid pressure operated means for actuating said bars, chambers in which an end of each of said bars reciprocates, oil reservoirs for the respective chambers, each reservoir having ports connecting it to the respective chamber to supply oil thereto and receive oil therefrom incident to the reciprocations of the respective bar therein, and a valve adjustable to vary the effective size of one of said ports.

19. Gear shifting mechanism comprising means for effecting different forward and also reverse gear changes, means connected to said gear changing means for setting it to effect different forward gear changes, an element connected to said setting means and movable into different positions in accordance with the forward gear change settings of the gear changing means, and a member governed by the position occupied by said element for setting the gear changing means for reverse.

20. Gear shifting mechanism comprising means for effecting different forward and also reverse gear changes, means connected to said gear changing means for setting it to effect different forward gear changes, an element connected to said setting means and movable in accordance with the settings of said gear changing means for effecting different forward gear changes and a member operative to set the gear changing means for reverse, said element having a cut-away portion which permits operation of said member while said element is in one position and having another portion which obstructs and thereby prevents operation of said member while said element is in another position.

21. Shifting mechanism for an automobile transmission mechanism embodying a gear changing element shiftable in different directions to effect different gear changes comprising fluid pressure operated actuating means, including a vane-shaped piston pivoted to swing in opposite directions and having means for operatively connecting it to said gear changing element to shift it in said different directions, and valve means for said piston for controlling the action of fluid pressure thereon to cause actuation thereof in one or the other direction.

EDWARD J. THURBER.